United States Patent [19]

Sacconi

[11] Patent Number: 5,120,003
[45] Date of Patent: Jun. 9, 1992

[54] CHANGEABLE FISHING REEL CARTRIDGE WITH LINE

[76] Inventor: Roberto L. Sacconi, Chacra 50, Junin de Los Andes, Neuquen, Argentina, 8371

[21] Appl. No.: 561,781

[22] Filed: Aug. 2, 1990

[51] Int. Cl.⁵ .......................................... A01K 89/016
[52] U.S. Cl. ...................................... 242/317; 242/322
[58] Field of Search ............. 242/310, 311, 312, 315, 242/317, 318, 322, 323, 71.8, 68.3, 106

[56] References Cited

U.S. PATENT DOCUMENTS

| | | | |
|---|---|---|---|
| 1,461,043 | 7/1923 | Moll | 242/310 X |
| 2,116,581 | 5/1938 | Moor | 242/317 X |
| 2,471,723 | 5/1949 | Cannon | 242/317 X |
| 3,254,861 | 6/1966 | Jahn | 242/318 |
| 3,351,301 | 11/1967 | Bretton | 242/318 X |
| 3,478,977 | 11/1969 | Sarah | 242/318 X |
| 3,603,524 | 9/1971 | Nurmse et al. | 242/310 |
| 3,614,015 | 10/1971 | Sussman | 242/312 |
| 3,741,493 | 6/1973 | Jones | 242/318 X |
| 4,352,474 | 10/1982 | Kovalovsky | 242/318 X |
| 4,461,435 | 7/1984 | Kovalovsky | 242/318 X |

FOREIGN PATENT DOCUMENTS

| | | | |
|---|---|---|---|
| 208034 | 3/1984 | Fed. Rep. of Germany | 242/322 |
| 257760 | 6/1988 | Fed. Rep. of Germany | 242/322 |
| 2183431 | 6/1987 | United Kingdom | 242/318 |

Primary Examiner—Katherine Matecki
Attorney, Agent, or Firm—Malin, Haley, McHale, DiMaggio & Crosby

[57] ABSTRACT

A fishing reel and changeable cartridge spool that is especially useable with a fly fishing reel or a spinning reel which allows cartridges containing fishing lines of different weights and densities to be quickly and readily interchanged onto the spool of a single reel. The improved reel spool includes a system that permits attachment of a first and a second cartridge spool filled with a line. The removable cartridge spool is mounted on the first spool which includes a threaded end face that is threadably connected to the spool axle and spool end face. The device employs one spool, which can be threadably separated and a cartridge spool which contains the line and which fits over the first spool axle and includes a locking detent so that the first and cartridge spools are in effect locked together. The first spool fits on the conventional reel shaft. The reel housing and the drag and winding mechanisms are not changed.

7 Claims, 1 Drawing Sheet

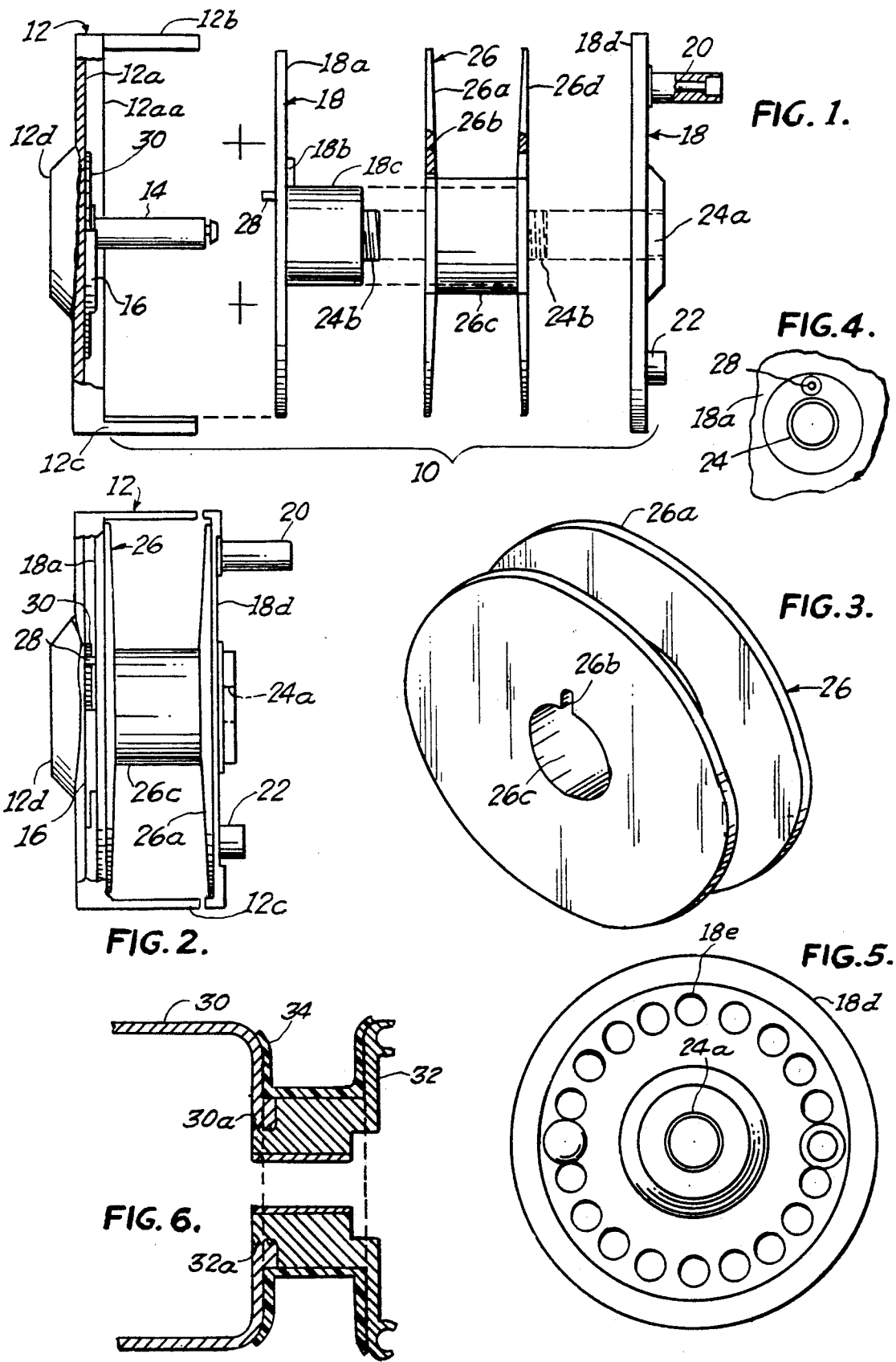

CHANGEABLE FISHING REEL CARTRIDGE WITH LINE

BACKGROUND OF THE INVENTION

1. Field of the Invention

This invention relates to fishing reels and especially reels used for fly fishing and spinning fishing, the invention relating to a removable cartridge that can be interchanged with a different cartridge to permit the use of different fishing lines of different weights and densities within the spool of a single reel.

2. Description of the Prior Art

Fishing reels as used for fly fishing and spinning fishing are well known in the art. One of the great drawbacks in both a spinning reel and a fly fishing reel is that the spool containing the fishing line is a rigid structure that requires the line be directly removed from the spool and a new line added directly to the spool or to buy a spare spool that costs at least fifty percent of the total cost of the reel and fill it with backing and line. This is a time consuming and cumbersome job at best especially when time is of the essence or an expensive alternative. Because fishing conditions and locations vary during a single fishing period, it is often desirable to use different fishing lines. This requires having numerous reels or spare spools each with a different line. To change a line on a single reel several times while fishing would be extremely time consuming if you do not have a spare spool ready. The same problems exists in spinning fishing if the line gets tangled or another line diameter is required.

The present invention overcomes the problems of a conventional fishing reel by providing an additional spool or spools, each of which acts as a cartridge for a separate fishing line that can be interchangeably installed or removed from the spool of a single fishing reel constructed in accordance with the present invention. Thus a plurality of individual cartridges each containing a different line may be taken to the fishing location and can be installed or removed from the fishing reel whenever necessary. Use of the invention results in the fisherman having much less weight from extra spools to carry to the fishing activity.

The fishing reel operation is not altered with the present invention with respect to the drag mechanism or the reeling mechanism. The interchangeable cartridges are themselves mounted on the spool of the fishing reel which can be separated quickly by end plate removal which allows attachment or removal of the interchangeable cartridge. The invention can be used for fly fishing reels as well as spinning reels in accordance with the principles taught herein.

SUMMARY OF THE INVENTION

An interchangeable fishing line cartridge and fishing reel especially suited for fly fishing or spinning reels comprising a fishing reel including a circular disk housing and a rigid central shaft projecting from the center and attached to one side of said housing. A first removable spool is mounted on the housing shaft, said first removable spool including a first axle having a threaded connector end piece, said first axle being mounted rotatably over said reel shaft, and including a cylindrical hollow passage concentrically disposed around said spool shaft. The first spool includes a detachable end plate. A second interchangeable cartridge spool containing a fishing line is mounted on said first spool axle. The first and second cartridge spools are locked together and rotate together.

The first spool end plate includes a handle or knob that is used to rotate the first spool and therefore the second spools containing the line.

The interchangeable cartridge spool includes at least one locking detent which receives a locking pin mounted on the inside face of the first spool end plate so that the first and second spools are locked together to prevent relative motion in between, especially when a fish is on the line. Friction between the first and cartridge spool end plates also prevents relative movement.

The reel housing includes a conventional drag mechanism and is not part of the invention discussed herein. The reel housing also includes a pole mounting flange that attaches the reel to a fishing rod and finger guards along the top and bottom to prevent interference with the line on a spool.

To install the interchangeable cartridge spool containing the fishing line, the first spool end plate is twisted to unlock the threaded coupling with the center bushing which acts as a first axle for the first spool. Once the end plate is removed, the interchangeable cartridge spool can be quickly installed or removed with a second cartridge spool replacement having a different fishing line.

The first spool thus can include one removable end plate which allows the cartridge spool to be readily attached over the axis of the first spool. The first spool also includes a projecting pin on its outside face that engages the drag mechanism discussed above. The bushing used in the first spool is pressed into an aperture through the spool axle so that the bushing has a projecting end tip threaded member and does not move relative to the first spool end face or cylindrical axis. The end plate for the first spool includes a knob for rotating the first and cartridge spools relative to the reel housing in a conventional manner.

The second spool is of a unitary construction and includes two circular disk shaped end faces and a cylindrical axle or shaft that itself has an enlarged opening therethrough sized to comfortably fit concentrically about the cylindrical axle of the first spool. The cartridge spool also includes an indentation adjacent the axle for engaging a key or tab on the first spool inside face plate to firmly lock the cartridge spool with respect to the first spool to prevent relative rotation between the spools. The key on the first spool face fits into a detent or notch in the cartridge spool thereby locking the two spools together so there is no relative rotational motion between the first spool and the cartridge spool in the locked position. In addition, when the removable end plate from the first spool is threadably engaged tightly with respect to the first spool shaft with the cartridge spool in position, there will be frictional contact between the first and cartridge spool end plates which also resist relative rotation between the two spools.

The present invention thus allows for quick removal of the cartridge spool which will contain the fishing line to be used. A series of cartridge spools, each containing a fishing line by weight, density or other fisherman preferences, can thus be established to quickly and efficiently install a desired line and spool onto the spool of the reel. This changeable cartridge spool thus eliminates the task of directly changing the line which heretofore would be on the first spool. The cartridge spool then in effect serves for storing a particular fishing line.

The removable cartridge spool may also be created for a spinning reel which typically has a large diameter housing that abuts the reel portion that typically holds the fishing line. In this embodiment the first spool is threadably connected into the enlarged reel housing and is removable and thus allows for the installation of the cartridge spool of unitary construction that houses the fishing line.

It is an object of this invention to provide an improved system on a fishing reel that has interchangeable and removable cartridge spools housing the fishing line, without buying an expensive extra spool or spools that have to be filled with line after they are purchased.

It is another object of this invention to provide a fly fishing reel and spinning reel with removable cartridges that are spools containing particular fish lines of desired weight and densities that can be readily interchanged and used for right or left handed fishermen.

Yet still another object of this invention is to provide a non-complex, fishing reel with an interchangeable inexpensive cartridge spool for use with a fly fishing reel or spinning reel.

In accordance with these and other objects which will be apparent hereinafter, the instant invention will now be described with particular reference to the accompanying drawings.

BRIEF DESCRIPTION OF THE DRAWINGS

FIG. 1 shows a side elevational view exploded of a fishing reel in accordance with the present invention including the interchangeable spool.

FIG. 2 shows a side elevational view of the present invention, with a portion of the reel housing cut away to show the drag mechanism.

FIG. 3 shows a perspective view of an interchangeable cartridge spool that would house a fishing line as used with the present invention.

FIG. 4 shows a front elevational view cut away of the central shaft and bushing as used in the first spool of the invention.

FIG. 5 shows a back elevational view of the first spool outside end face.

FIG. 6 shows a cross sectional elevational view of a spinning reel constructed in accordance with the present invention.

PREFERRED EMBODIMENT OF THE INVENTION

Referring now to the drawings and specifically FIG. 1, the present invention is shown generally at 10 comprised of a fishing reel housing 12 that includes a first spool 18 having end plate 18a which ultimately is connected to the opposite end plate 18d by a threaded connector 24 which is engaged into the threaded female connection 24a in the operating position.

The fly fishing reel housing 12 includes a disk shaped housing 12a that has a raised lip 12aa about its annular periphery and an upper housing shield 12b that acts as a guard for the entire reel and a lower rod mounting member 12c which includes an elongated portion that extends forward and backward relative to the housing which is used for connection to a fishing pole in a conventional manner. The reel housing 12 includes conventional center protective cap 12d and a main support shaft 14 extending from the center of the circular disc shaped housing end 12a. Also connected to housing 12 is a drag mechanism which includes a gear 30 and a drag pin 16 which engages the outer periphery of gear 30 to create the appropriate drag. The gear mechanism and drag pin 16 are conventional and do not form part of the invention. The rigid shaft 14 is used to act as an axle for a first spool 18 and a cylindrical bushing 24 which is pressed into the axle 18c in spool 18. Spool 18 in the operating position when mounted on shaft 14 can rotate relative to shaft 14.

The first spool 18 which is comprised of a spool end face 18a and spool end face 18d and a cylindrical axle 18c. A rotatable handle 20 is mounted on the outside face of end plate 18d perpendicular to spool end face 18d and is used to rotate the first spool, the cartridge spool and the fishing line contained on the cartridge spool, which will be described in greater detail below. The female threaded connector 24a is firmly locked in the center of end plate 18d and receives the male threaded connector 24b of bushing 24 which is pressed so as not to rotate in the center of cylindrical axle 18c of spool 18. Spool 18 also includes a locking pin 18b which may be cast as part of the entire unit 18c and end plate 18a. The locking pin 18b fits in a groove or space 26b in either end plate of cartridge spool 26 permitting use for left or right handed fishermen. The cartridge spool 26 can therefore be placed and locked onto the spool axle from either side of the spool. The purpose of locking key 18b is to prevent any relative motion between spool 18 and cartridge spool 26 when cartridge spool 26 is mounted in the operating position. The spool end face 18d may also include a counterweight 22 diametrically opposed to the handle 20 for balancing the rotational movement of the spool and reel mechanism. Counterweight 22 and actuating handle 20 are conventional and do not form part of the invention. The outside end plate 18a of spool 18 also includes a drag operating pin 28 which engages a plurality of raised members on gear 30 to actuate the drag mechanism. Again the drag mechanism does not form part of the invention but is conventional in operation.

A cartridge spool 26 which may be made of lightweight plastic of unitary construction includes an end plate 26a and end plate 26d unitarily connected together by cylindrical axle 26c which is hollow with a hollow inside diameter that slightly exceeds the exterior diameter of cylindrical shaft 18c on spool 18. In operation, cartridge spool 26 would be filled with a fishing line of a predetermined weight and density. The fishing line not shown is wound in a conventional manner around the cylindrical axle 26c of spool 26.

Referring now to FIG. 2, the reel mechanism in accordance with the present invention is shown in its operational position. In this position, cartridge spool 26 is mounted on first spool 18 which has the end plate 18a and 18d connected together by the coupling of male threaded connector 24b with spool 18 end plates 18a and 18d firmly threadably locked in place. Cartridge spool 26 is also locked in place and rotates with spool 18 by the actuation of handle 20 rotationally. The firm lock of the threaded connectors 24b and 24a in conjunction with drag between the outside of the end faces of cartridge spool 26 flush against the inside of spool 18 end faces keep the outside end plate 18d firmly locked in position so that it does not disconnect despite any resistance on the line or resistance to rotation of the spool 18 and cartridge spool 26. Thus the operation of the entire fishing reel in all conditions of fishing will not be affected by the fact that the first spool 18 can be disconnected through the threaded connectors.

FIG. 3 shows the cartridge spool 26 that includes a detent or opening 26b that is used to receive the locking pin 18b (see FIG. 1) integrally formed on the inside of spool face 18a. Also note the opening formed in the cylindrical axle 26c of cartridge spool 26 which is sized in diameter to fit snugly over the outside diameter of spool cylindrical axle 18c. In the operation of the invention, the fisherman would have a plurality of inexpensive cartridge spools 26 in his fishing box. Each cartridge spool 26 would contain a different fishing line so that lines of different weights and different densities are available for selection. Because of the invention, the cartridge spool 26 becomes interchangeable quickly so that the fisherman with the present invention has a multitude of different lines available at a very affordable price which can be interchanged rapidly based on changes in fishing conditions and personal desires and is easy to carry because of the extra light weight. The use of the invention thus alleviates the typical prior art fly fishing reel in which all the lines have to be removed from a spool 18 or storage on spare spools that have to be filled by the fisherman. With the additional cartridge spool 26, lines can be rapidly interchanged from right to left hand without going through completely removing an individual line from the reel.

FIG. 4 shows the outside of end plate 18a of spool 18 and includes a pressed bushing 24 that does not rotate relative to spool 18 because it is pressed in the center aperture of cylindrical axle 18c. Also shown is the drag actuating pin 28 which projects outwardly from the end plate (see FIG. 1).

FIG. 5 shows the inside surface of end plate 18d which includes the female threaded connector 24a pressed in the center of end face 18d. The end plate 18d also includes a plurality of apertures 18e which are conventional.

The invention has been described with respect to a typical fly reel that is used in fly fishing. The present invention can also be used with a spinning reel as shown in FIG. 6. Spinning reel typically has a very large cylindrical housing 30 that includes a spool at its end. The prior art spool housing 30 and the attached spool were one unit with the line wrapped around the protruding spool. In the present invention, as shown in FIG. 6, the spinning reel housing 30 is threadably attached to a first spool 32 by threaded members 30a and threaded members 32a. Thus spool 32 can be detached from the cylindrical housing 30 because of the threaded connectors. The cartridge spool 34 of unitary construction 34 having an inside diameter sized to fit over the outside diameter of spool 32 can thus be interchangeably mounted on housing 30 over spool 32. The interchangeable cartridge spool 34 would include the desired fishing line. Other cartridge spools sized as spool 34 containing different lines can be thus employed and interchanged on the spinning reel housing.

The present invention is shown to provide a fishing reel that includes an interchangeable or a cartridge-like second spool that fits onto a first spool and interlocks to prevent rotation with the first spool being constructed so that one end plate is removable through a threaded connector from another end plate to permit the mounting of the interchangeable cartridge spool housing the fishing line. Although the invention is shown only for fly fishing and spinning reel instructions, the invention could be utilized in other fishing reels to obtain the similar desired results.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. A fishing reel that provides for an interchangeable line bearing cartridge spool comprising:
   a housing, said housing including a flat wall, said housing having a rigid first spool receiving shaft affixed thereto and protruding away from said wall;
   a cartridge spool;
   first spool means for mounting said cartridge spool, said first spool means comprising a first end plate, a first spool axle attached rigidly to said first end plate, a second end plate, and means for connecting said second end plate to said first spool axle, said first spool axle having a hollow aperture which is fitted over said first spool receiving shaft;
   means attached to said first spool means for manually rotating said first spool means;
   said cartridge spool comprising two end plates and a central cartridge spool axle unitarily connected therebetween, said cartridge spool axle being fitted over and mounted upon said first spool axle, said cartridge spool carrying a supply of fishing line, whereby said cartridge spool can be installed on or removed from said first spool.

2. A fishing reel as in claim 1, including:
   means for locking said cartridge spool to said first spool means to prevent relative rotational motion between said cartridge spool and said first spool means.

3. A fishing reel as in claim 1, wherein:
   said cartridge spool end plates and said first spool end plates are frictionally engaged with said cartridge spool end plates when said cartridge spool is mounted and installed on said first spool means.

4. A fishing reel as in claim 2, wherein:
   said locking means includes a key integrally connected to said first spool means and said cartridge spool including at least one aperture for receiving said key for locking said first spool means to said cartridge spool.

5. A fishing reel as in claim 4, wherein:
   said cartridge spool includes an aperture within each cartridge spool end plate so that the cartridge spool is reversible for right or left handed fishermen.

6. A fishing reel as in claim 1, including:
   drag means connected to said housing for providing drag on the rotation of said first spool means said first spool means including a means for connecting said first spool means to said drag means.

7. A fishing reel as in claim 1, wherein:
   said means connecting said first spool axle and said first spool second end plate includes a threaded connector.

* * * * *